United States Patent
Elkanovich et al.

(10) Patent No.: US 12,235,717 B2
(45) Date of Patent: Feb. 25, 2025

(54) COMMUNICATION SYSTEM BETWEEN DIES AND OPERATION METHOD THEREOF

(71) Applicants: Global Unichip Corporation, Hsinchu (TW); Taiwan Semiconductor Manufacturing Company, Ltd., Hsinchu (TW)

(72) Inventors: Igor Elkanovich, Hsinchu (TW); Yung-Sheng Fang, Hsinchu (TW); Pei Yu, Hsinchu (TW); Chang-Ming Liu, Hsinchu (TW)

(73) Assignees: Global Unichip Corporation, Hsinchu (TW); Taiwan Semiconductor Manufacturing Company, Ltd., Hsinchu (TW)

( * ) Notice: Subject to any disclaimer, the term of this patent is extended or adjusted under 35 U.S.C. 154(b) by 73 days.

(21) Appl. No.: 17/982,538

(22) Filed: Nov. 8, 2022

(65) Prior Publication Data
US 2024/0152418 A1  May 9, 2024

(51) Int. Cl.
*G06F 11/07* (2006.01)
*H04L 1/00* (2006.01)

(52) U.S. Cl.
CPC ...... *G06F 11/0772* (2013.01); *G06F 11/0754* (2013.01); *H04L 1/0045* (2013.01)

(58) Field of Classification Search
CPC ............. G06F 11/0772; G06F 11/0754; H04L 1/0045; H04L 1/1816; H04L 1/1858; H04L 1/189; H04L 1/0041
USPC ................................ 714/746, 766, 748–750
See application file for complete search history.

(56) References Cited

U.S. PATENT DOCUMENTS

| 11,088,782 | B2 | 8/2021 | Carlough et al. | |
| 2004/0153909 | A1* | 8/2004 | Lim | H04L 1/0009 714/714 |
| 2005/0249236 | A1* | 11/2005 | Walden | H04L 1/0072 370/465 |

(Continued)

FOREIGN PATENT DOCUMENTS

| CN | 107544938 | 1/2018 |
| EP | 2723010 | 4/2014 |
| TW | 201346572 | 11/2013 |

OTHER PUBLICATIONS

"Office Action of Taiwan Counterpart Application", issued on Dec. 21, 2023, p. 1-p. 15.

*Primary Examiner* — Albert Decady
*Assistant Examiner* — Osman M Alshack
(74) *Attorney, Agent, or Firm* — JCIPRNET

(57) ABSTRACT

A communication system and an operation method thereof are provided. A transmitting device transmits a data unit to a receiving device through a data channel of a communication interface. The transmitting device calculates an original verification information unit of the data unit and synchronously transmits the original verification information unit to the receiving device through a verification information channel of the communication interface based on a transmission timing of the data unit in the data channel. After receiving a current data unit and before receiving a next data unit, the receiving device verifies whether the current data unit received from the data channel has errors in real time based on a current original verification information unit corresponding to the current data unit.

16 Claims, 14 Drawing Sheets

(56) References Cited

U.S. PATENT DOCUMENTS

| | | | |
|---|---|---|---|
| 2008/0137689 A1* | 6/2008 | Shiizaki | H04L 1/1887 |
| | | | 370/498 |
| 2013/0061118 A1* | 3/2013 | Pi | H04L 1/004 |
| | | | 714/E11.031 |
| 2013/0179746 A1* | 7/2013 | Hamada | H04L 25/4908 |
| | | | 714/748 |
| 2016/0234820 A1* | 8/2016 | Mallik | H04L 1/1861 |
| 2019/0158223 A1* | 5/2019 | Carlough | H04L 1/0045 |
| 2019/0313382 A1* | 10/2019 | Sun | H04W 72/23 |
| 2020/0044844 A1* | 2/2020 | Sridhara | H04W 12/03 |
| 2020/0065185 A1* | 2/2020 | Mayer | G06F 11/1044 |
| 2020/0136764 A1* | 4/2020 | Zhang | H04L 1/0057 |
| 2021/0075542 A1* | 3/2021 | Kneckt | H04L 1/0061 |
| 2021/0392659 A1* | 12/2021 | Tirronen | H04W 72/535 |

* cited by examiner

FIG. 5 — Pin layout 300

| VSS | T_D0 | T_D7 | T_D11 | VDDP | T_PAR | T_D26 | T_FC1 | VSS | R_D25 | R_D19 | R_D15 | VDDP | R_D6 | R_DBI3 |
|---|---|---|---|---|---|---|---|---|---|---|---|---|---|---|
| T_DBI0 | T_D1 | VSS | T_D12 | T_D16 | T_D20 | VDDP | T_FC0 | R_D29 | R_D24 | VSS | R_D14 | R_D10 | R_D5 | VDDP |
| VDDP | T_LR0 | T_D8 | T_FR | VSS | T_D21 | T_D27 | T_D30 | VDDP | R_LR1 | R_D18 | R_D13 | VSS | R_D4 | R_DBI2 |
| T_DBI1 | T_D2 | VDDP | T_DCKP | T_D17 | T_D22 | VSS | T_D31 | R_D28 | R_D23 | VDDP | R_DCKN | R_D9 | R_D3 | VSS |
| VSS | T_D3 | T_D9 | T_DCKN | VDDP | T_D23 | T_D28 | R_D31 | VSS | R_D22 | R_D17 | R_DCKP | VDDP | R_D2 | R_DBI1 |
| T_DBI2 | T_D4 | VSS | T_D13 | T_D18 | T_LR1 | VDDP | R_D30 | R_D27 | R_D21 | VSS | R_FR | R_D8 | R_LR0 | VDDP |
| VDDP | T_D5 | T_D10 | T_D14 | VSS | T_D24 | T_D29 | R_FC0 | VDDP | R_D20 | R_D16 | R_D12 | VSS | R_D1 | R_DBI0 |
| T_DBI3 | T_D6 | VDDP | T_D15 | T_D19 | T_D25 | VSS | R_FC1 | R_D26 | R_PAR | VDDP | R_D11 | R_D7 | R_D0 | VSS |

FIG. 5

COMMUNICATION SYSTEM BETWEEN DIES AND OPERATION METHOD THEREOF

BACKGROUND

Technical Field

The disclosure related to a communication system, and more particularly, to communication system between dies and an operation method thereof.

Description of Related Art

Digital electronic devices based on semiconductor integrated circuits, such as mobile phones, digital cameras, personal digital assistants (PDAs), etc., are designed with more powerful functions to suit various applications in the modern digital world. However, with the trend in semiconductor manufacturing, digital electronic devices are becoming smaller and lighter and are equipped with improved functionality and higher performance. Semiconductor devices can be packaged into 2.5D semiconductor devices in which several dies can be integrated into larger integrated circuits (ICs). Contact elements, interposer layers, or redistribution layers (RDLs) are used to make connections between different dies. The integrated fan-out (InFO) and chip-on-wafer-on-substrate (CoWoS) packaging technologies can be used to package multiple chips/dies that are assembled side-by-side.

Regarding the entire electronic circuit, one die may need to be electrically connected to one or more dies. Communication takes place between different dies. The transmitting device (one of the dies) can transmit data to the receiving device (another die) through the communication interface. However, due to noise interference or other factors, the data received by the receiving device from the communication interface may be erroneous. How to ensure the correctness of the data received by the receiving device is still one of many technical issues.

It should be noted that the contents disclosed in the "Description of Related Art" section is used for enhancement of understanding of the disclosure. A part of the contents (or all of the contents) disclosed in the "Description of Related Art" section may not pertain to the conventional technology known to people having ordinary skill in the art. The information disclosed in the "Description of Related Art" section does not mean that the content is known to people having ordinary skill in the art before the filing of the disclosure.

SUMMARY

The disclosure provides a communication system and an operation method thereof to ensure the correctness of data transmitted between a transmitting device (e.g., one die or chip) and a receiving device (e.g., another die or chip).

In an embodiment of the disclosure, the communication system includes a transmitting device and a receiving device. The transmitting device is configured to transmit a data unit stream to a data channel of a communication interface. The data unit stream includes a plurality of data units. The transmitting device calculates an original verification information unit of each of the data units. The transmitting device transmits the original verification information units corresponding to these data units to a verification information channel of the communication interface based on a transmission timing of these data units in the data channel. The receiving device is configured to receive these data units of the data unit stream from the data channel of the communication interface and receive the original verification information units corresponding to these data units from the verification information channel of the communication interface. After receiving a current data unit among the data units and before receiving a next data unit among the data units, the receiving device verifies whether the current data unit received from the data channel has errors in real time based on a current original verification information unit corresponding to the current data unit.

In an embodiment of the disclosure, the operation method includes the following steps. A transmitting device calculates an original verification information unit of each of a plurality of data units included in a data unit stream. The transmitting device transmits the data unit stream to a data channel of a communication interface. The transmitting device transmits the original verification information units corresponding to the data units to a verification information channel of the communication interface based on a transmission timing of the data units in the data channel. A receiving device receives the data units of the data unit stream from the data channel of the communication interface. The receiving device receives the original verification information units corresponding to the data units from the verification information channel of the communication interface. After receiving a current data unit among the data units and before receiving a next data unit among the data units, the receiving device verifies whether the current data unit received from the data channel has errors in real time based on a current original verification information unit corresponding to the current data unit in the original verification information units.

Based on the above, in the embodiments provided by the disclosure, the transmitting device can transmit the data unit and the original verification information unit to the receiving device through different channels of the communication interface. Therefore, the transmission of the original verification information units does not consume the bandwidth of the data channel of the communication interface. After receiving the current data unit and before receiving the next data unit, the receiving device can verify whether the current data unit received from the data channel has errors in real time based on the current original verification information unit corresponding to the current data unit. Therefore, the transmission latency of the communication system can be minimized.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 5 is a schematic view illustrating the structure of a contact element pattern according to an embodiment of the disclosure.

DESCRIPTION OF THE EMBODIMENTS

Figure 1:
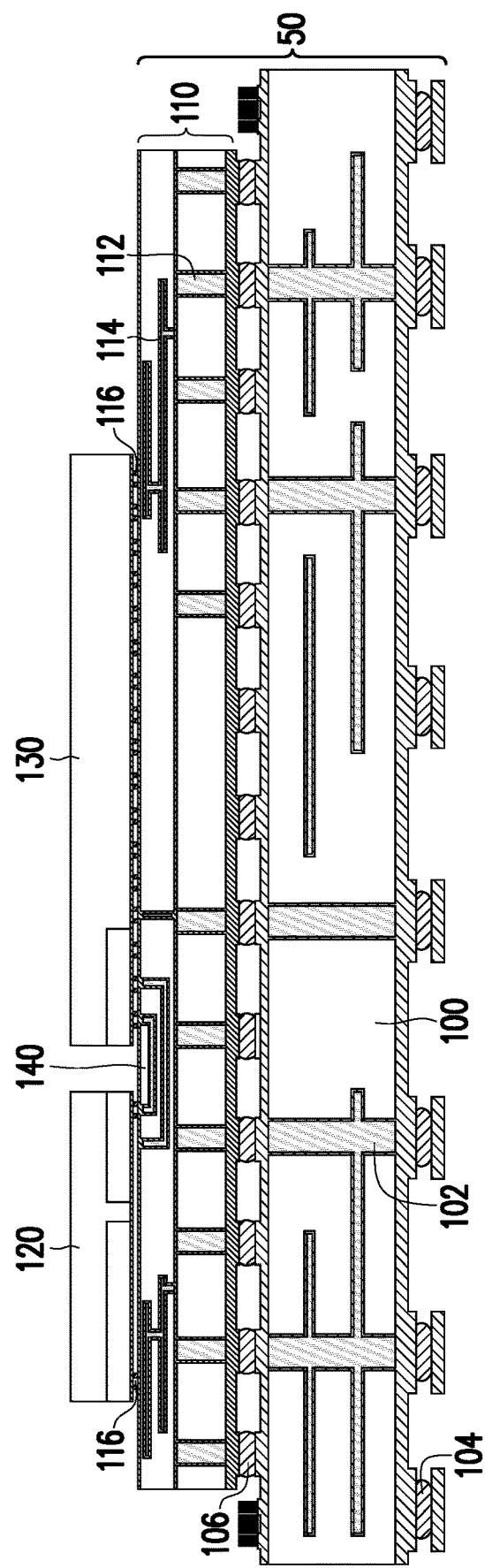
FIG. 1 is a schematic view illustrating a cross-sectional stacked structure of a 2.5D semiconductor device with a communication interface according to an embodiment of the disclosure.

The term "coupled to (or connected to)" used in the entire disclosure (including claims) refers to any direct or indirect connecting means. For instance, if the disclosure describes a first apparatus is coupled to (or connected to) a second apparatus, the description should be explained as the first apparatus is connected directly to the second apparatus, or the first apparatus, through connecting other apparatus or using certain connecting means, is connected indirectly to the second apparatus. In addition, terms such as "first" and "second" in the entire specification (including claims) are used only to name the elements or to distinguish different embodiments or scopes and should not be construed as the upper limit or lower limit of the number of any element and should not be construed to limit the order of the elements. Moreover, elements/components/steps with the same reference numerals represent the same or similar parts in the figures and embodiments where appropriate. Descriptions of the elements/components/steps with the same reference numerals or terms in different embodiments may be references for one another.

The disclosure relates to data transmission between two devices, for example, two dies or two chips. Several embodiments are provided below to describe the disclosure, but the disclosure is not limited to the embodiments.

The entire integrated circuit can be manufactured into a semiconductor device through a semiconductor manufacturing process, and the semiconductor device can be manufactured based on a stack structure of a 2.5D semiconductor device. The interface of the die (receiving device) for receiving data may include a frame decoding circuit associated with a de-serialized circuit. In an embodiment, the interface in the semiconductor structure is integrated in the entire integrated circuit.

First, semiconductor manufacturing will be described. FIG. 1 is a schematic view illustrating a cross-sectional stacked structure of a 2.5D semiconductor device with a communication interface according to an embodiment of the disclosure. With reference to FIG. 1, based on 2.5D packaging technology, a chip-on-wafer-on-substrate (CoWoS) or an integrated fan-out (InFO) platform 50 with an expected integrated circuit structure is formed. The CoWoS or the InFO platform 50 may include a package substrate 100 with a solder ball 104 at the bottom and a contact element 106 at the top. A via 102 can be used to connect from the solder ball 104 at the bottom to the contact element 106 at the top. In addition, an interposer layer or a redistribution layer (RDL) 110 may be further formed on the substrate 100, and is connected to the contact element 106. The interposer layer or the RDL layer 110 is embedded with a routing structure 140, and the routing structure 140 has a routing path for connection purposes. The interposer layer or the RDL layer 110 may further include a through-silicon-Via (TSV) 112, an interconnect wiring 114, and a contact element 116. Here, depending on the manufacturing process that is adopted, the contact element 116 may be a via or a contact element or any suitable connection structure for terminal-to-terminal contact. This embodiment provides no limitation to the type of the contact elements 106 and 116.

In practical applications, an additional die can also be used, such as an application-specific integrated circuit (ASIC) die 130 and a serializer-deserializer (SerDes) die 120 for implementing the CoWoS or InFO platform 50. The ASIC die 130 and the SerDes die 120 are connected by a routing structure 140 (wiring 114 and contact element 116). One ASIC die 130 can be connected to multiple SerDes dies 120 for various peripheral communications.

Figure 2:
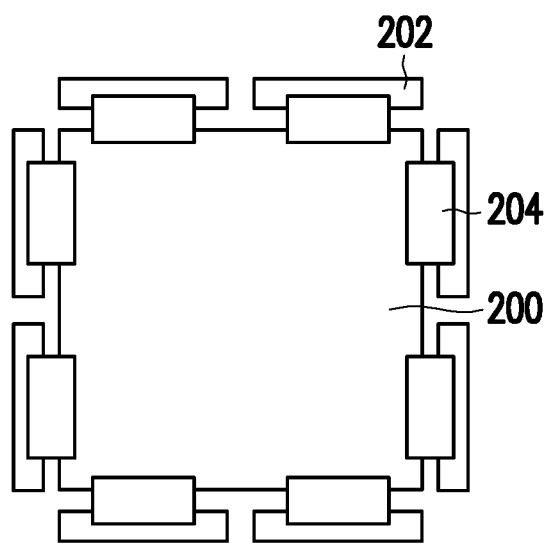
FIG. 2 is a schematic top view illustrating a die connected to a plurality of other dies through a communication interface according to an embodiment of the disclosure.

FIG. 2 is a schematic top view illustrating a die connected to a plurality of other dies through a communication interface according to an embodiment of the disclosure. With reference to FIG. 2, a die 200 (for example, a processor or an ASIC die) can be connected to a plurality of dies 202 through a communication interface 204, so that data can be transmitted between the die 200 and the die 202. The communication interface 204 may include wiring and contact elements in the contact element pattern so that the die 200 can be connected to the die 202.

Figure 3:
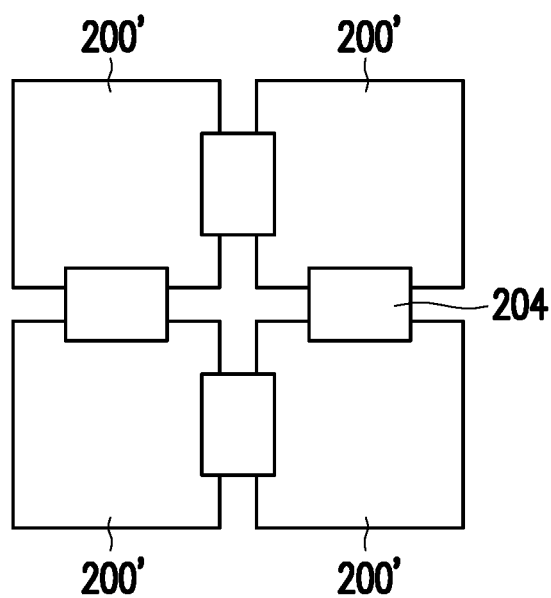
FIG. 3 is a schematic top view illustrating a plurality of dies connected to each other through a communication interface according to another embodiment of the disclosure.

FIG. 3 is a schematic top view illustrating a plurality of dies connected to each other through a communication interface according to another embodiment of the disclosure. With reference to FIG. 3, a plurality of processor dies 200' can be connected together to form a large-scale processor with functions that are more powerful. Under the circumstances, these processor dies 200' are also connected through the communication interface 204.

As described above, the 2.5D packaging process can be applied to stack various dies side by side without substantially further consuming device area. However, in order to allow the dies to be connected more freely, the contact elements in the communication interface 204 need to be appropriately arranged in a compact manner and further symmetrized for receiving and transmitting signals. The communication between the die 200 to the die 202 can be easily arranged in the peripheral area. Here, the communication interface 204 may also refer to a Glink interface provided in the market.

Figure 4:
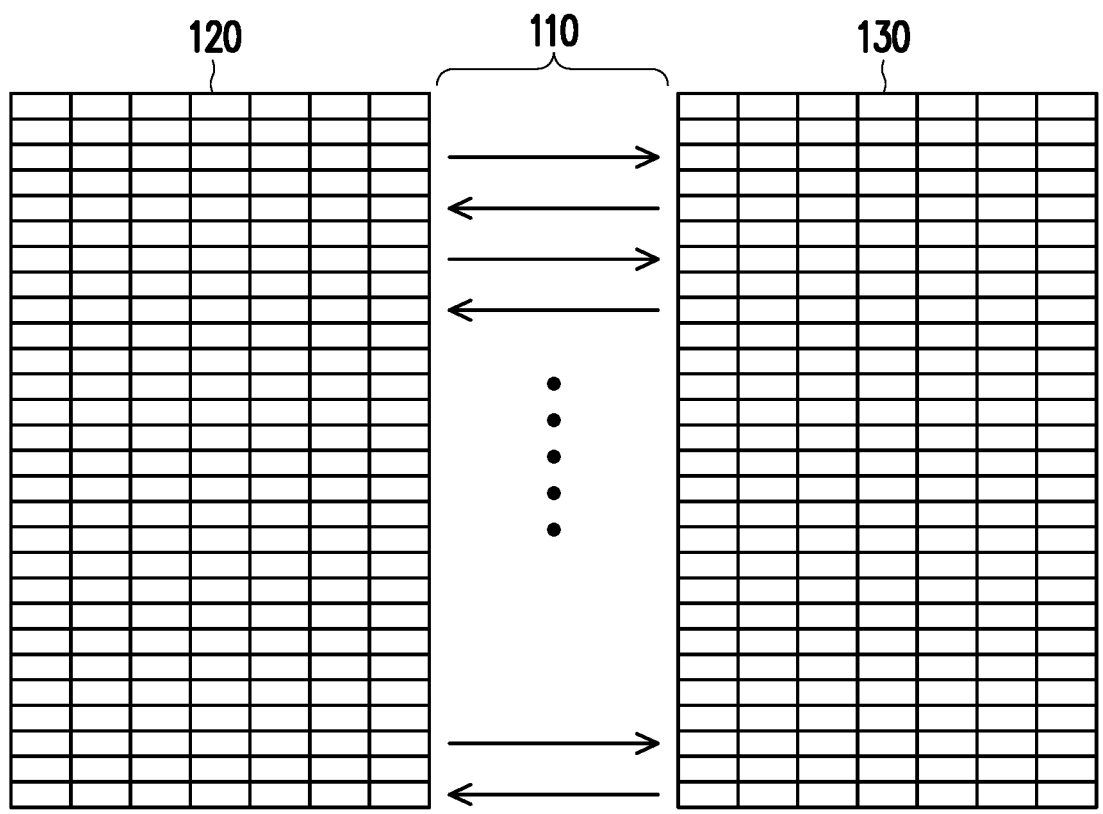
FIG. 4 is a schematic view illustrating communication between two dies based on an interface having an interposer layer or a redistribution layer according to an embodiment of the disclosure.

FIG. 4 is a schematic view illustrating communication between two dies based on an interface having an interposer layer or an RDL layer according to an embodiment of the disclosure. With reference to FIG. 4, in an example, the ASIC die 130 and the SerDes die 120 communicate through an interposer layer or the RDL layer 110. The contact elements of the ASIC die 130 and the SerDes die 120 that are used for being in contact with the interposer layer or the RDL layer 110 are appropriately arranged. Each contact element can transmit one specific signal simultaneously. Therefore, parallel busbars are established based on contact elements. The signal at each contact element is in a serial format, such as a bit string.

FIG. 5 is a schematic view illustrating the structure of a contact element pattern according to an embodiment of the disclosure. With reference to FIG. 5, the total number of contact elements involved in the communication interface can be one number, and the signals are transmitted in parallel in the communication interface. The total number of contact elements involved in the communication interface can be a greater number. The signal is transmitted in parallel among the dies. According to the size of the data in a busbar, the size of the 32-bit data with the operating voltage and other functional signals is set as a slice (refer to the contact element pattern 300). The contact element pattern 300 can be duplicated in a certain number (for example, 8) to adapt to the total data size in the parallel communication. In an embodiment, the data corresponds to 32 bits having a sequence of R_D0 to R_D31 and T_D0 to T_D31. In the sequence, T represents a contact element for transmission and R represents a contact element for reception. In addition, the contact element pattern 300 further includes a plurality of low voltage signals VSS and a plurality of high voltage signals VDDP. Furthermore, various functional signals are further included, including FRAM T/R_FR, clock T/R_DCK_P/N, flow control T/R_FC[1:0], DBI T/R_DBI [3:0], parity T/R_PAR, and lane repair T/R_LR[1:0]. However, the contact element used for the functional signal is not limited to those mentioned in the embodiment.

Table 1 is an example of contact elements defining a transmitting (T) group or a receiving (R) group. The transmitting group and the receiving group have the same number of contact elements.

TABLE 1

| Type of contact element | Number | Definition |
| --- | --- | --- |
| Data, T/R [31:0] | 32 | Data bits are synchronized with CLK |
| Frame, T/R_FRAME | 1 | FRAME bit is synchronized with CLK |
| Clock, T/R_DCK_P/N | 2 | CLK differential pair |
| Flow control, T/R_FC[1:0] | 2 | For data busbar that is asynchronous and in different directions |
| DBI, T/R_DBI[3:0] | 4 | One DBI per tuple, used to reverse the content of busbar for better single sign-on (SSO) |
| Parity, T/R_PAR | 1 | One every 32 bits, used to identify error conditions |
| Lane repair, T/R_LR[1:0] | 2 | The lane repair bit, used to repair data, parity, and DBI, but not used to repair CLK, FRAME, and FC signals |

Based on the interposer layer or RDL layer 110 described above, various signals carry out communication between the two dies. However, in an example, a group of parallel signals in communication can be converted into a serial format to be transmitted/received through a wiring with a contact element. Once the data signal in serial format is received by the die, the die will deserialize the data signal into a parallel format.

Figure 6:
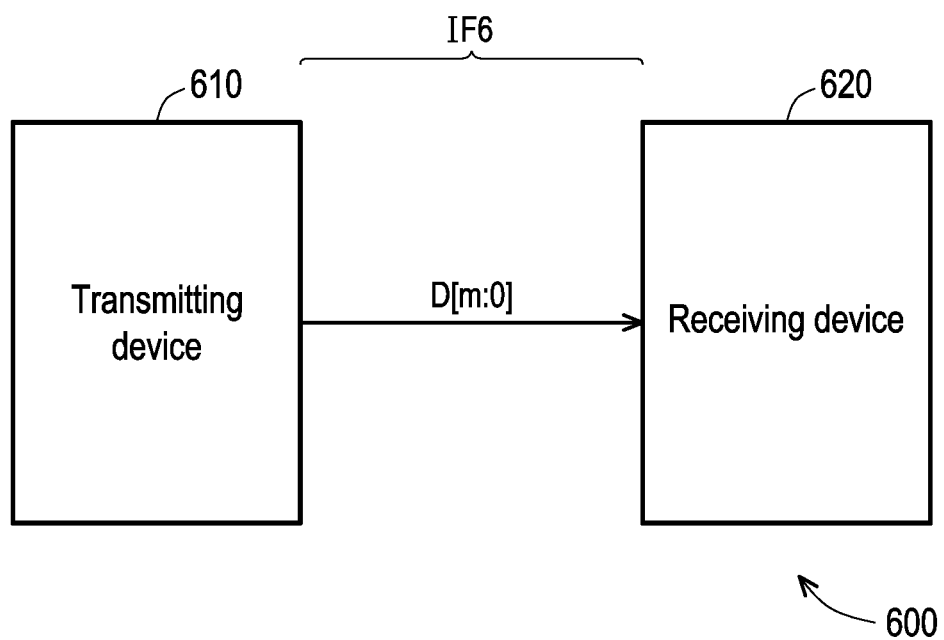
FIG. 6 is a schematic circuit block diagram illustrating a communication system according to an embodiment of the disclosure.

FIG. 6 is a schematic circuit block diagram illustrating a communication system 600 according to an embodiment of the disclosure. The communication system 600 shown in FIG. 6 includes a transmitting device 610 and a receiving device 620. This embodiment provides no limitation to the product categories of the transmitting device 610 and the receiving device 620. For instance, according to actual design, the transmitting device 610 and/or the receiving device 620 each may be a die, a chip, an integrated circuit, an electronic device, or other devices/elements. In the implementation example in which the transmitting device 610 and the receiving device 620 are two dies, the related description of the SerDes die 120 and/or the ASIC die 130 can serve as one of the many implementation examples of the transmitting device 610 and/or the receiving device 620. Alternatively, the transmitting device 610 and/or the receiving device 620 can be inferred by referring to the description related to the die 200, the die 202, and/or the processor die 200', and a communication interface IF6 can be inferred by referring to the description related to the communication interface 204. According to the actual design and applications, in some embodiments, the communication interface IF6 may be any interface regulated by a small die-to-die interconnect standard. For instance, the communication interface IF6 may be an interface compliant with the Universal Chiplet Interconnect Express (UCIe) standard.

The transmitting device 610 can transmit the data unit stream to the receiving device 620 through the data channel of the communication interface IF6. Generally, a data unit stream is divided into a plurality of packets for cyclic redundancy check (CRC), and each packet has a plurality of data units, such as a current data unit D[m:0] shown in FIG. 6. Each data unit is a piece of data of m+1 bits, and m is an integer determined according to the actual design. For instance, the data width of the current data unit D[m:0] can be 256 bits, 512 bits, or other bits.

The transmitting device 610 can calculate a corresponding piece of CRC data for each packet. The transmitting device 610 can transmit a packet and its corresponding CRC data to the receiving device 620 through the same data channel of the communication interface IF6 in a time-division multiplexing manner. Transmission of packets and CRC data over the same data channel may be referred to as in-band CRC transmission. After the receiving device 620 receives a packet and its corresponding CRC data from the same data channel of the communication interface IF6, the receiving device 620 can verify whether the entire packet received from the data channel has errors based on the corresponding CRC data. The receiving device 620 will perform subsequent processing on the multiple data units in the packet after the packet is determined to be correct.

Figure 7:
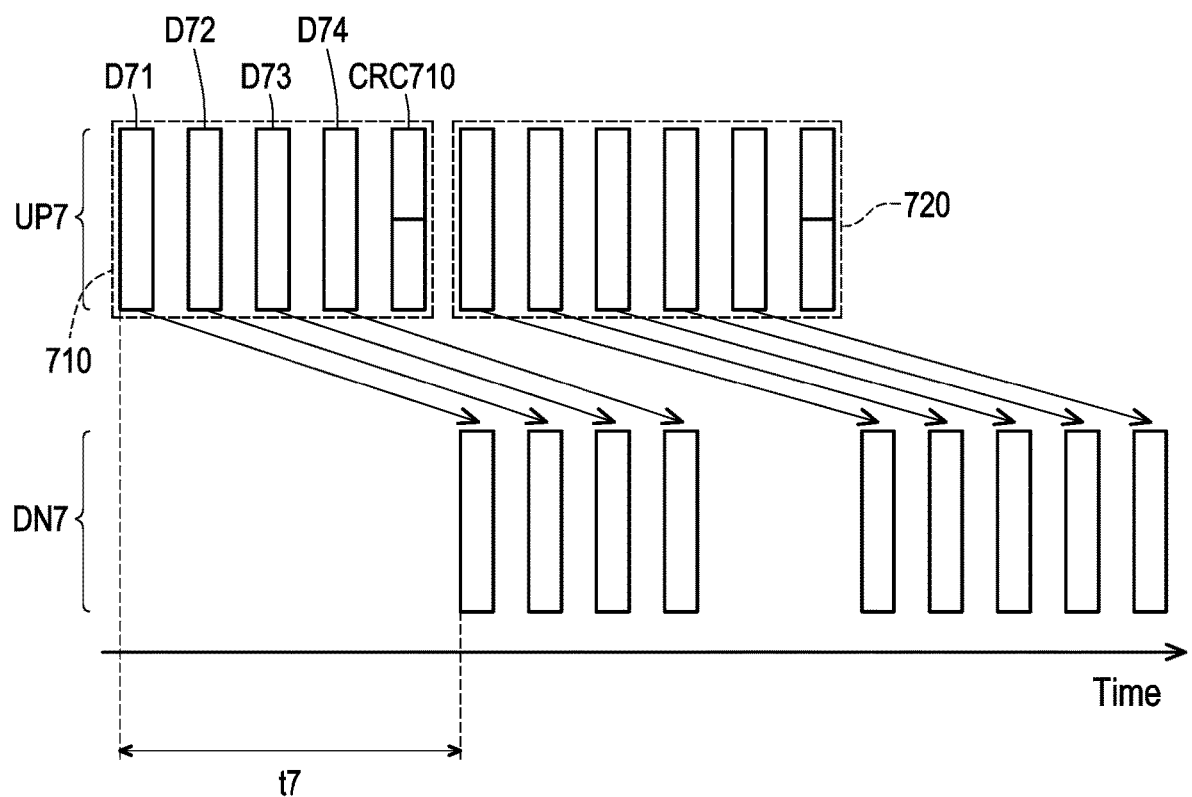
FIG. 7 is a schematic timing diagram illustrating in-band CRC transmission according to an embodiment.

FIG. 7 is a schematic timing diagram illustrating in-band CRC transmission according to an embodiment. The horizontal axis of FIG. 7 represents time. With reference to FIG. 6 and FIG. 7, The upper half UP7 of FIG. 7 represents a data unit stream input to a physical layer (PHY layer, not shown) of the transmitting device 610. Each long rectangle shown in FIG. 7 represents a data unit. Each data unit is a piece of parallel data of m+1 bits, and m is an integer determined according to the actual design. The data unit stream is divided into a plurality of packets, such as a packet 710 and a packet 720 shown in FIG. 7. Each packet has a plurality of data units. For instance, the packet 710 shown in FIG. 7 has data units D71, D72, D73, and D74.

The transmitting device 610 can calculate a corresponding piece of CRC data for each packet. For instance, the transmitting device 610 calculates a piece of CRC data CRC710 for the entire packet 710 (data units D71 to D74). The physical layer of the transmitting device 610 can transmit multiple data units D71 to D74 and one piece of corresponding CRC data CRC710 to the receiving device 620 through the same data channel of the communication interface IF6 in a time-division multiplexing manner, as shown in the upper half UP7 of FIG. 7. As for other packets (e.g., the packet 720), reference may be made to the relevant description of the packet 710 and analogy can be made, and repeated description is thus not provided herein, The physical layer of the transmitting device 610 can transmit the data unit stream (packets including the CRC data) shown in the upper half UP7 of FIG. 7 to the receiving device 620 through the same data channel of the communication interface IF6 according to timing. Therefore, for the convenience of description, the upper half UP7 of FIG. 7 can also be understood as a timing diagram of the data unit stream received by the physical layer (not shown) of the receiving device 620 from the same data channel of the communication interface IF6. The lower half DN7 of FIG. 7 represents the timing of the subsequent processing of the multiple data units in the packet after the receiving device 620 completes the CRC processing. The receiving device 620 needs to wait until all the data units D71 to D74 of the same packet 710 and the corresponding CRC data CRC710 are received, and then the receiving device 620 can verify whether the entire packet 710 (all data units D71 to D74) received from the data channel has errors based on the CRC data CRC710. The receiving device 620 will perform subsequent processing on all the data units D71 to D74 in the packet 710 after the packet 710 is determined to be correct, as shown in the lower half DN7 of FIG. 7A. It can be seen from FIG. 7 that the communication system 600 shown in FIG. 6 has a non-negligible transmission latency t7.

Figure 8:
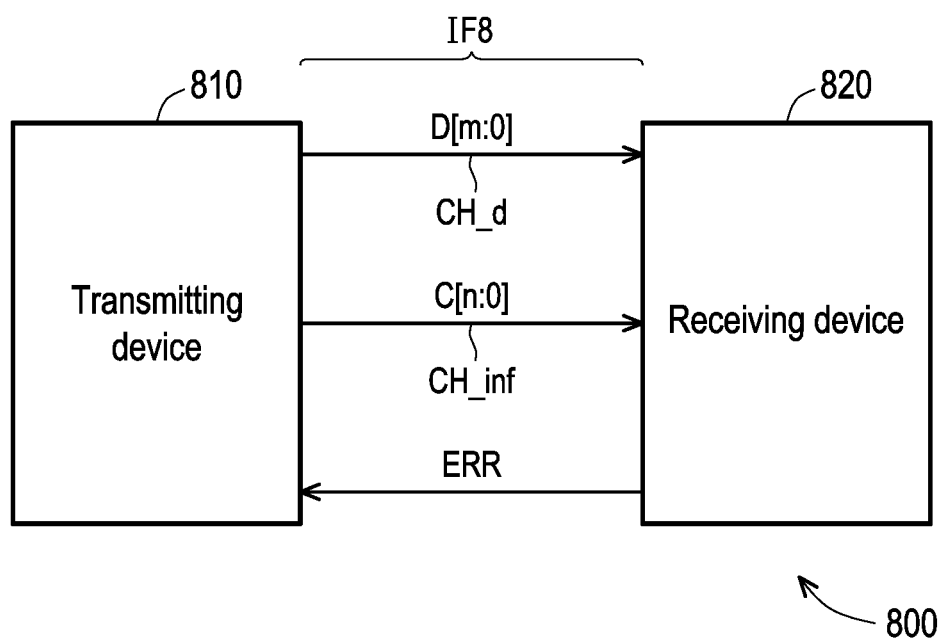
FIG. 8 is a schematic circuit block diagram of a communication system according to an embodiment of the disclosure.

FIG. 8 is a schematic circuit block diagram of a communication system 800 according to an embodiment of the disclosure. The communication system 800 shown in FIG. 8 includes a transmitting device 810 and a receiving device 820. This embodiment provides no limitation to the product categories of the transmitting device 810 and the receiving device 820. For instance, according to actual design, the transmitting device 810 and/or the receiving device 820 each may be a die, a chip, an integrated circuit, an electronic device, or other devices/elements. In the implementation example in which the transmitting device 810 and the receiving device 820 are two dies, the related description of the SerDes die 120 and/or the ASIC die 130 can serve as one of the many implementation examples of the transmitting device 810 and/or the receiving device 820. Alternatively, the transmitting device 810 and/or the receiving device 820 can be inferred by referring to the description related to the die 200, the die 202, and/or the processor die 200', and a communication interface IF8 can be inferred by referring to the description related to the communication interface 204. According to the actual design and applications, in some embodiments, the communication interface IF8 may be any interface regulated by a small die-to-die interconnect standard. For instance, the communication interface IF8 may be a Glink interface.

The transmitting device 810 can transmit the data unit stream to a data channel CH_d of the communication interface IF8 and then transmit the data unit stream to the receiving device 820. The data unit stream includes a plurality of data units, such as the current data unit D[m:0] shown in FIG. 8. Each data unit is a piece of data of m+1 bits, and m is an integer determined according to the actual design. For instance, the data width of the current data unit D[m:0] shown in FIG. 8 can be 256 bits, 512 bits, or other bits.

Figure 9:
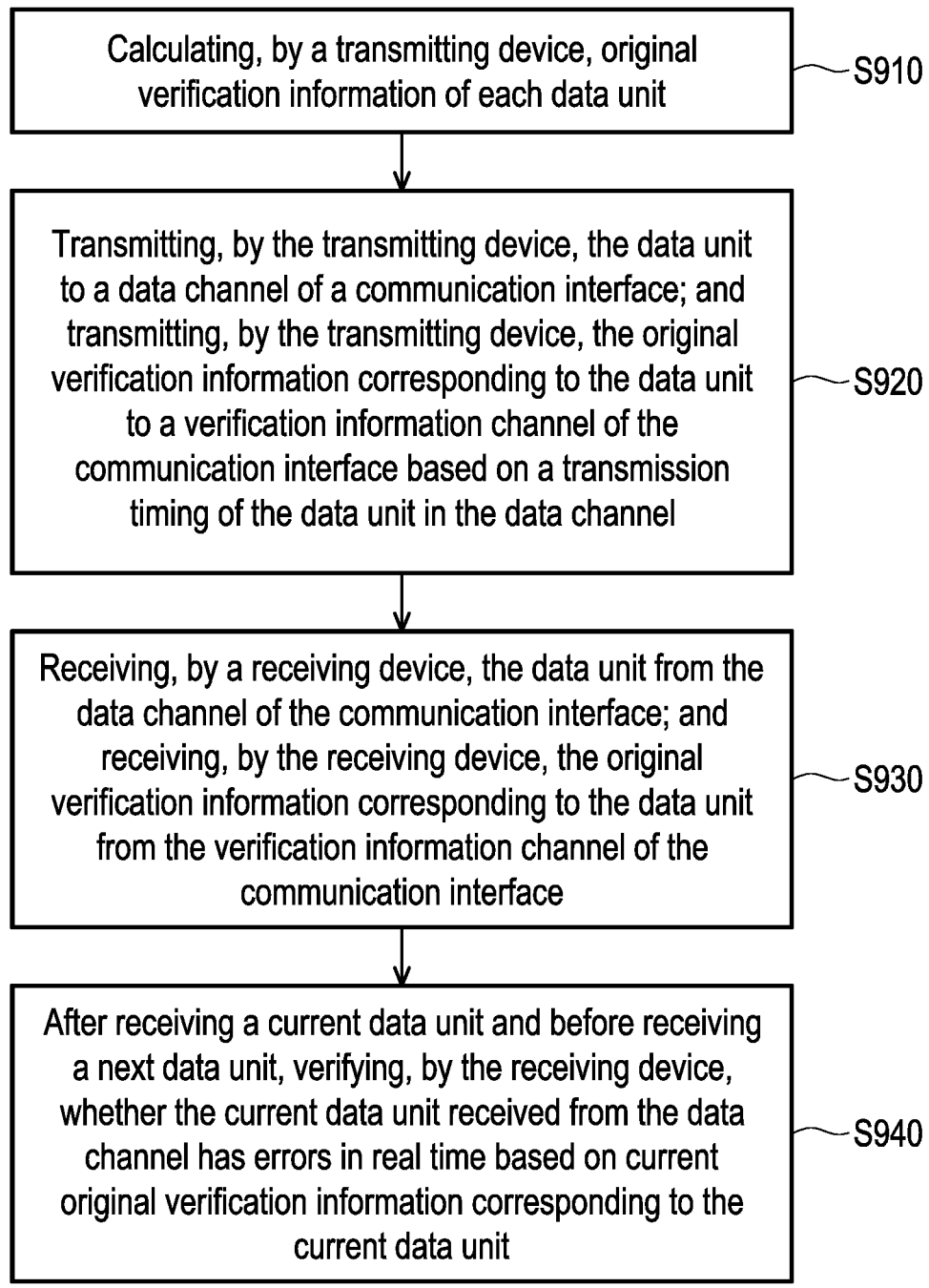
FIG. 9 is a schematic flow chart of an operation method of a communication system according to an embodiment of the disclosure.

FIG. 9 is a schematic flow chart of an operation method of a communication system according to an embodiment of the disclosure. With reference to FIG. 8 and FIG. 9, in step S910, the transmitting device 810 can calculate an original verification information unit of each of a plurality of data units included in a data unit stream. For instance, the transmitting device 810 can calculate current original verification information unit C[n:0] of the current data unit D[m:0]. This embodiment does not limit the specific implementation of the original verification information units. For instance, the original verification information unit may include cyclic redundancy check (CRC) data, parity check data, or other verification data, depending on the actual applications. The CRC data can be any type of CRC code (eg, 16-bit CRC code). Each original verification information unit is a piece of data of n+1 bits, and n is an integer determined according to the actual design. For instance, the data width of the current original verification information unit C[n:0] can be 8 bits, 16 bits, or other bits.

In step S920, the transmitting device 810 can transmit the data unit stream to the data channel CH_d of the communication interface IF8, and the transmitting device 810 can transmit the original verification information units corresponding to the data units to a verification information channel CH_inf of the communication interface IF8 (another channel different from the data channel CH_d) based on the transmission timing of the data units in the data channel CH_d. For instance, the transmitting device 810 can transmit the current data unit D[m:0] to the receiving device 820 through the data channel CH_d of the communication interface IF8. Based on the transmission timing of the current data unit D[m:0] in the data channel CH_d, the transmitting device 810 can synchronously transmit the current original verification information unit C[n:0] corresponding to the current data unit D[m:0] to the receiving device 820 through the verification information channel CH_inf of the communication interface IF8, as shown in FIG. 8.

In step S930, the receiving device 820 can receive these data units of the data unit stream from the data channel CH_d of the communication interface IF8 and can receive the original verification information units corresponding to these data units from the verification information channel CH_inf of the communication interface IF8. After receiving a current data unit among the data units and before receiving a next data unit among the data units, the receiving device 820 can verify whether the current data unit received from the data channel CH_d has errors in real time based on a current original verification information unit (original verification information corresponding to the current data unit) in the original verification information units (step S940). The transmission of the data unit stream and the original verification information units over different channels may be referred to as out-of-band transmission.

Figure 10:
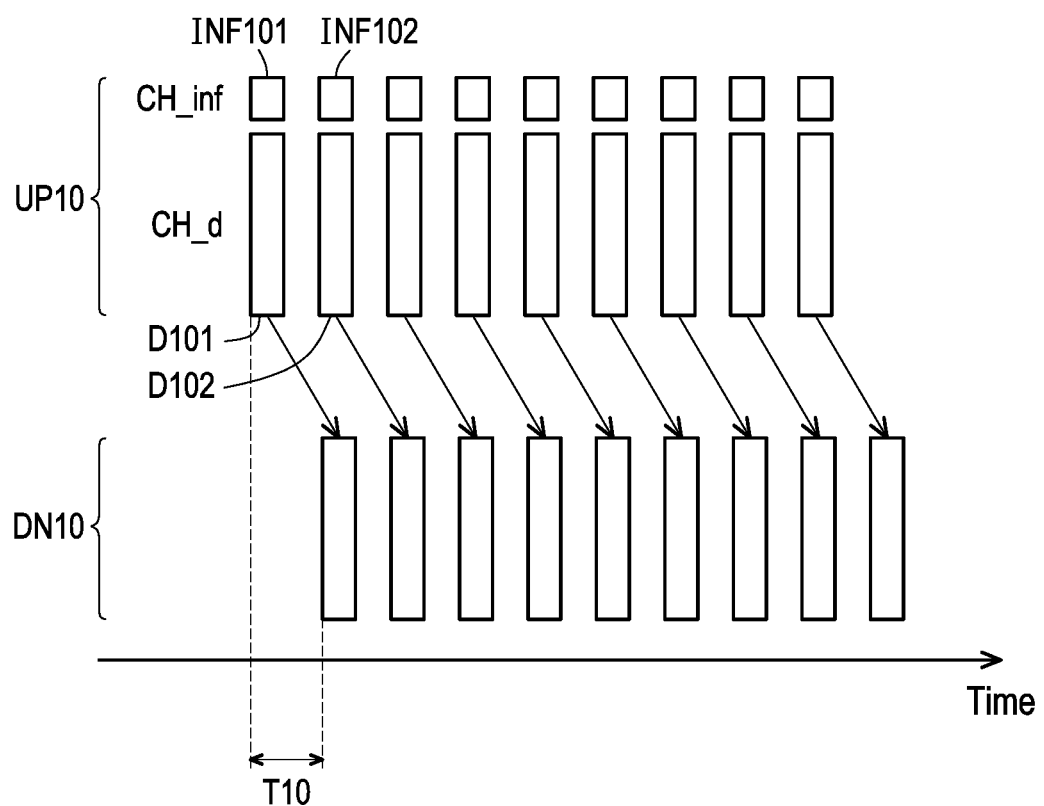
FIG. 10 is a schematic timing diagram illustrating out-of-band transmission according to an embodiment of the disclosure.

FIG. 10 is a schematic timing diagram illustrating out-of-band transmission according to an embodiment of the disclosure. The horizontal axis of FIG. 10 represents time. With reference to FIG. 8 and FIG. 10, The upper half UP10 of FIG. 10 is a schematic timing diagram of the original verification information units received by the physical layer (not shown) of the receiving device 821 from the verification information channel CH_inf of the communication interface IF8 and a schematic timing diagram of the data unit stream received by the physical layer of the receiving device 820 from the data channel CH_d of the communication interface IF8. Each short rectangle shown in FIG. 10 represents an original verification information unit. Each long rectangle shown in FIG. 10 represents a data unit. For instance, FIG. 10 shows the paired current data unit D101 and the current original verification information unit INF101 and the paired next data unit D102 and the next original verification information unit INF102. For each data unit shown in FIG. 10, reference may be made to the relevant description of any data unit (e.g., data units D71, D72, D73, or D74) shown in FIG. 7 and analogy can be made, and repeated description is thus not provided herein.

In the embodiment shown in FIG. 10, when the transmitting device 810 transmits the current data unit D101 to the data channel CH_d, the transmitting device 810 can synchronously transmit the current original verification information unit INF101 corresponding to the current data unit D101 to the verification information channel CH_inf. Therefore, when the receiving device 820 receives the current data unit D101 from the data channel CH_d, the receiving device 820 can synchronously receive the current original verification information unit INF101 corresponding to the current data unit D101 from the verification information channel CH_inf.

For instance, the receiving device 820 can use the current data unit D101 received from the data channel CH_d to calculate a current calculated verification information unit corresponding to the current data unit D101. The receiving device 820 can compare the current calculated verification information unit with the current original verification information unit INF101 received from the verification information channel CH_inf to determine whether the current data unit D101 received from the data channel CH_d has errors. After receiving the current data unit D101 and before receiving the next data unit D102, the receiving device 820 can verify whether the current data unit D101 received from the data channel CH_d has errors in real time based on a current original verification information unit INF101 (original verification information corresponding to the current data unit D101). After the current data unit D101 is determined to be correct, the receiving device 820 can perform subsequent processing on the current data unit D101 in advance, as shown in the lower half DN10 of FIG. 10. Compared with the transmission latency t7 shown in FIG. 7, it can be seen from FIG. 10 that the communication system 800 shown in FIG. 8 can effectively shorten the transmission latency t10.

When the current data unit D101 received from the data channel CH_d of the communication interface IF8 is erroneous, the receiving device 820 can return an error flag ERR to the transmitting device 820. The transmitting device 810 can retransmit the current data unit D101 to the receiving device 820 through the data channel CH_d based on the error flag ERR. When the current data unit D101 received from the data channel CH_d of the communication interface IF8 is correct, then the transmitting device 810 can transmit the next data unit D102 and the next original verification information unit INF102 to the receiving device 820 respectively through the data channel CH_d and the verification information channel CH_inf.

Figure 11:
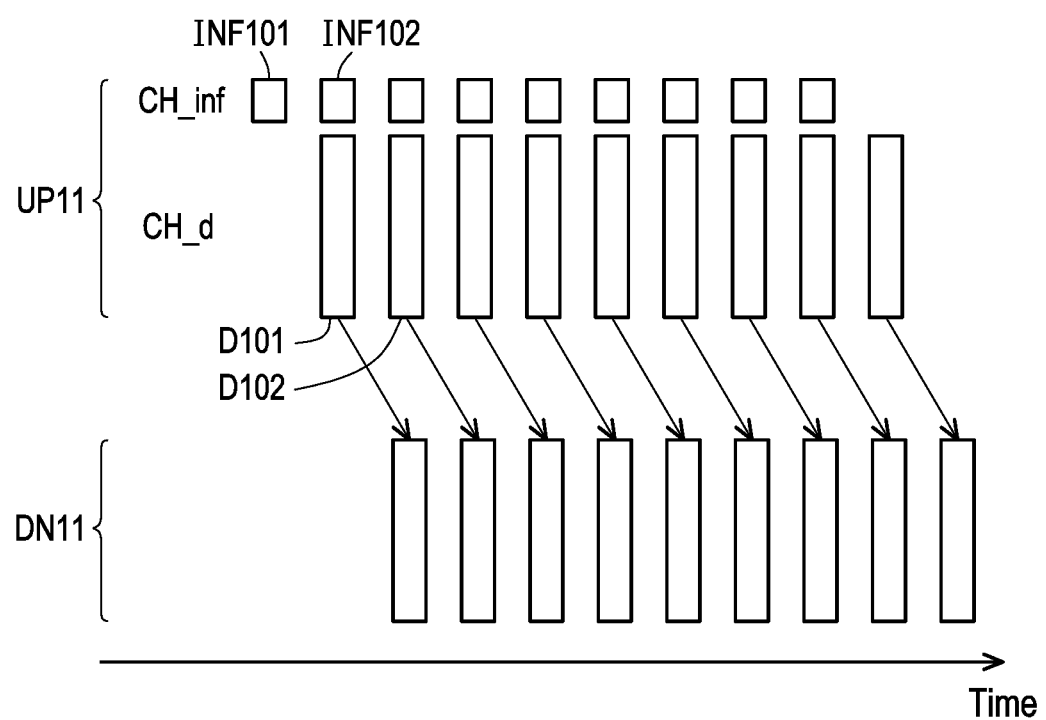
FIG. 11 is a schematic timing diagram illustrating out-of-band transmission according to another embodiment of the invention.
Figure 12:
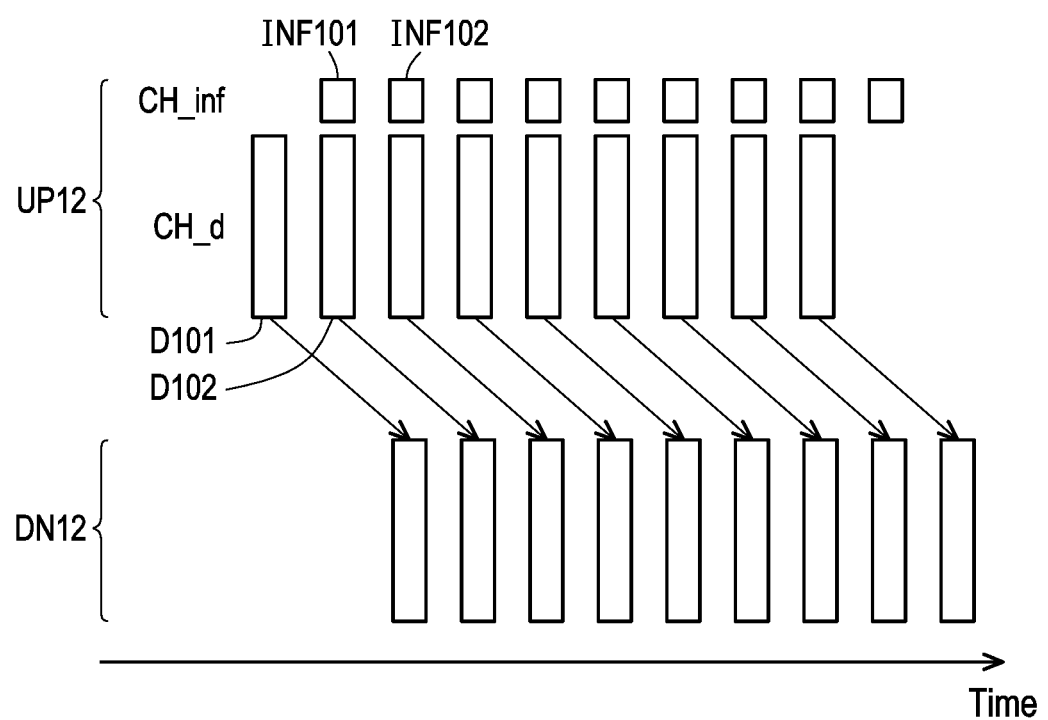
FIG. 12 is a schematic timing diagram illustrating out-of-band transmission according to another embodiment of the invention.
Figure 13:
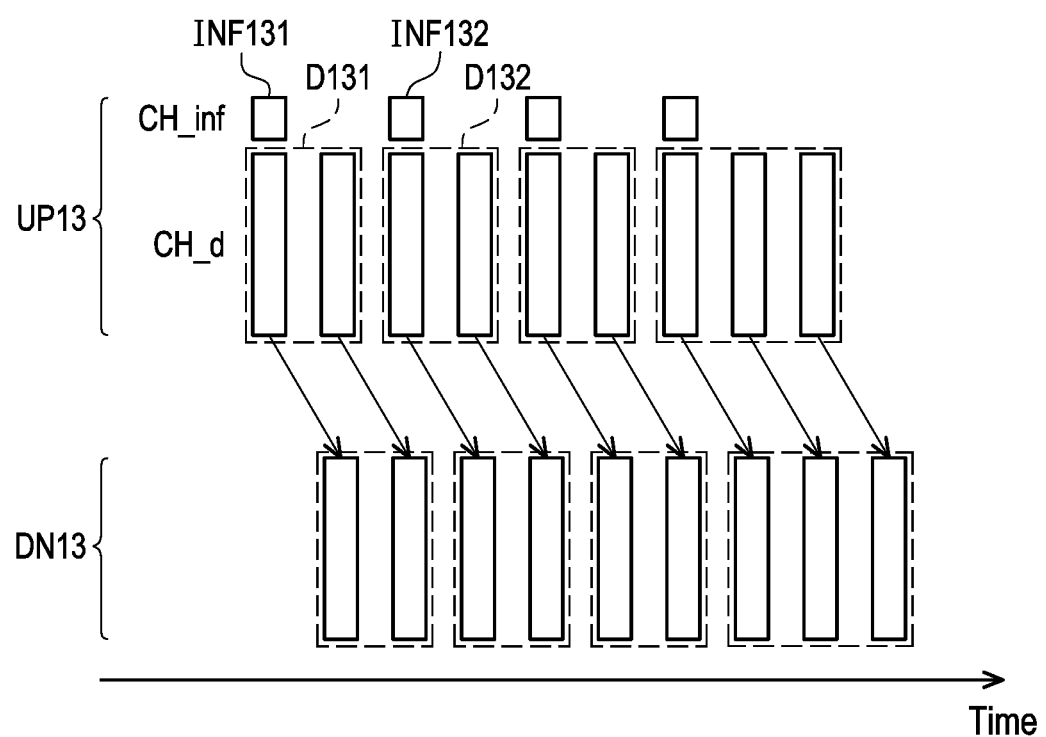
FIG. 13 is a schematic timing diagram illustrating out-of-band transmission according to yet another embodiment of the invention.
Figure 14:
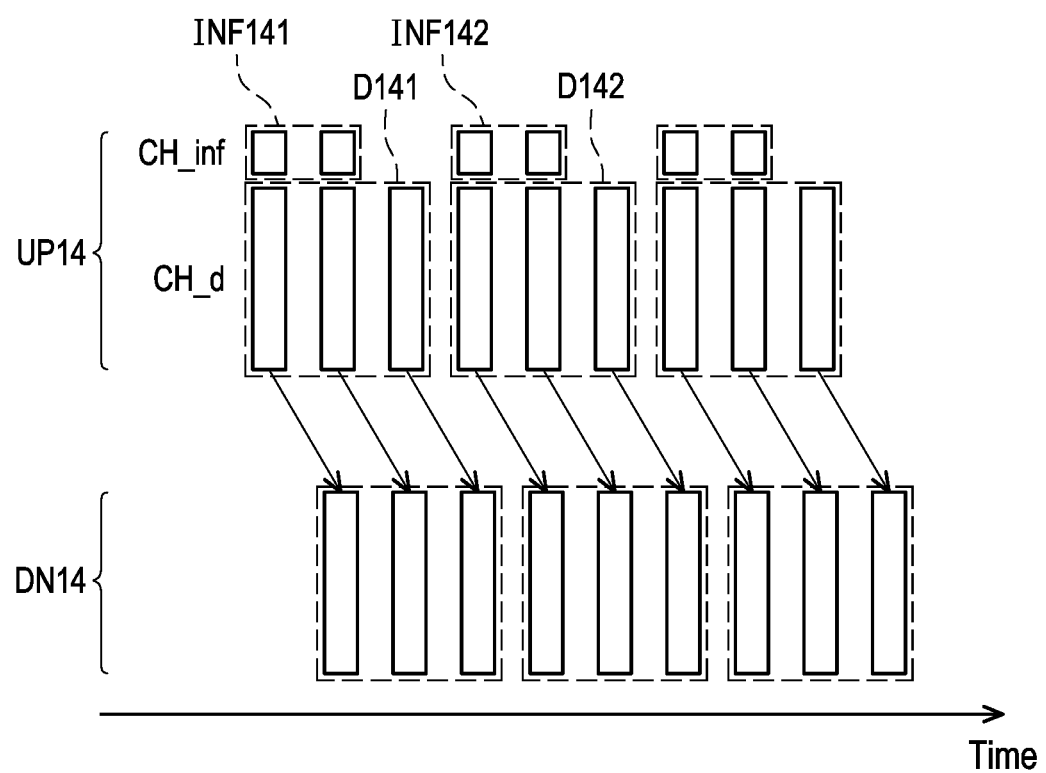
FIG. 14 is a schematic timing diagram illustrating out-of-band transmission according to yet another embodiment of the invention.

It should be noted that the timing and data size of the out-of-band transmission shown in FIG. 10 is one of many examples. Different embodiments may have different out-of-band transmission timings and/or different data sizes. For example, FIG. 11 and FIG. 12 illustrate different timing examples for out-of-band transmission. FIG. 13 and FIG. 14 illustrate different data size examples for out-of-band transmission.

FIG. 11 is a schematic timing diagram illustrating out-of-band transmission according to another embodiment of the invention. The horizontal axis of FIG. 11 represents time. For the upper half UP11, the lower half DN11, the current data unit D101, the current original verification information unit INF101, the next data unit D102 and the next original verification information unit INF102 shown in FIG. 11, reference may be made to the relevant description of the upper half UP10, The lower half of DN10, the current data unit D101, the current original verification information unit INF101, the next data unit D102 and the next original verification information unit INF102 shown in FIG. 10, and repeated description is thus not provided herein.

In the embodiment shown in FIG. 11, the transmission timing of the original verification information unit by the verification information channel CH_inf may lead the transmission timing of the data unit by the data channel CH_d. For example, the transmission timing of the current original verification information unit INF101 corresponding to the current data unit D101 may lead the transmission timing of the current data unit D101 by one time unit (or more time units), and the transmission timing of the next original verification information unit INF102 corresponds to the next data unit D102 may lead the transmission timing of the next data unit D102 by one time unit (or more time units). That is, based on the transmission timing of the data unit in the data channel CH_d, the transmitting device 810 can synchronously transmit the original verification information unit corresponding to the data unit to the receiving device 820 through the verification information channel CH_inf, as shown in FIG. 11.

FIG. 12 is a schematic timing diagram illustrating out-of-band transmission according to another embodiment of the invention. The horizontal axis of FIG. 12 represents time. For the upper half UP12, the lower half DN12, the current data unit D101, the current original verification information unit INF101, the next data unit D102 and the next original verification information unit INF102 shown in FIG. 12, reference may be made to the relevant description of the upper half UP10, The lower half of DN10, the current data unit D101, the current original verification information unit INF101, the next data unit D102 and the next original verification information unit INF102 shown in FIG. 10, and repeated description is thus not provided herein.

In the embodiment shown in FIG. 12, the transmission timing of the original verification information unit by the verification information channel CH_inf may lag behind the transmission timing of the data unit by the data channel CH_d. For example, the transmission timing of the current original verification information unit INF101 corresponding to the current data unit D101 may lag behind the transmission timing of the current data unit D101 by one time unit (or more time units), and the transmission timing of the next original verification information unit INF102 corresponds to the next data unit D102 may lag behind the transmission timing of the next data unit D102 by one time unit (or more time units). That is, based on the transmission timing of the data unit in the data channel CH_d, the transmitting device 810 can synchronously transmit the original verification information unit corresponding to the data unit to the receiving device 820 through the verification information channel CH_inf, as shown in FIG. 12.

FIG. 13 is a schematic timing diagram illustrating out-of-band transmission according to yet another embodiment of the invention. The horizontal axis of FIG. 13 represents time. The upper half UP13, the lower half DN13, the current data unit D131, the current original verification information unit INF131, the next data unit D132 and the next original verification information unit INF132 shown in FIG. 13 can refer to the relevant description of the upper half UP10, the lower half of DN10, the current data unit D101, the current original verification information unit INF101, the next data unit D102 and the next original verification information unit INF102 shown in FIG. 10, so they will not be repeated.

The difference from the embodiment shown in FIG. 10 is that, in the embodiment shown in FIG. 13, a data unit is divided into a plurality of transmission beats based on the data size of the data unit. Each short rectangle shown in FIG. 13 represents an original verification information unit, each dotted rectangle shown in FIG. 13 represents a data unit, and each solid long rectangle shown in FIG. 13 represents a transmission beat. For example, FIG. 13 shows the paired current data unit D131 and the current original verification information unit INF131, and the paired next data unit D132 and the next original verification information unit INF132. The current data unit D131 is divided into two transmission beats, and the next data unit D132 is divided into two transmission beats, as shown in FIG. 13.

FIG. 14 is a schematic timing diagram illustrating out-of-band transmission according to yet another embodiment of the invention. The horizontal axis of FIG. 14 represents time. The upper half UP14, the lower half DN14, the current data unit D141, the current original verification information unit INF141, the next data unit D142 and the next original verification information unit INF142 shown in FIG. 14 can refer to the relevant description of the upper half UP10, the lower half of DN10, the current data unit D101, the current original verification information unit INF101, the next data unit D102 and the next original verification information unit INF102 shown in FIG. 10, so they will not be repeated.

The difference from the embodiment shown in FIG. 10 is that, in the embodiment shown in FIG. 14, a data unit is divided into a plurality of transmission beats based on the data size of the data unit, and an original verification information unit is divided into a plurality of transmission beats based on the data size of the original verification information unit. Each small dashed rectangle shown in FIG. 14 represents an original verification information unit, and each large dashed rectangle shown in FIG. 14 represents a data unit. For example, FIG. 14 shows the paired current data unit D141 and the current original verification information unit INF141, and the paired next data unit D142 and the next original verification information unit INF142. The current data unit D141 is divided into three transmission beats, and the current original verification information unit INF141 is divided into two transmission beats, as shown in FIG. 14. By analogy, the next data unit D142 is divided into three transmission beats, and the next original verification information unit INF142 is divided into two transmission beats.

Figure 15:
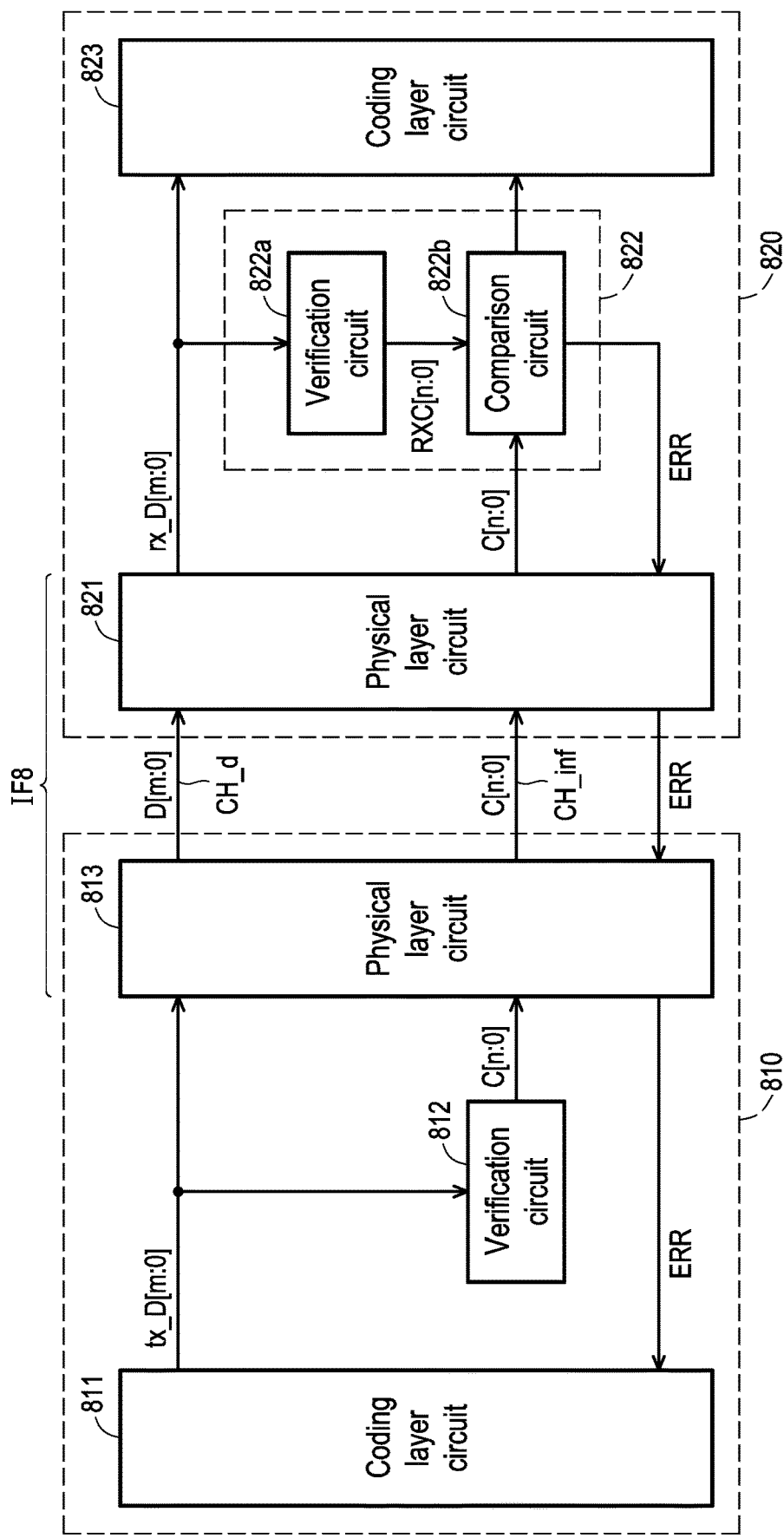
FIG. 15 is a circuit block diagram illustrating a transmitting device and a receiving device according to an embodiment of the disclosure.

FIG. 15 is a circuit block diagram illustrating the transmitting device 810 and the receiving device 820 according to an embodiment of the disclosure. The transmitting device 810 and the receiving device 820 shown in FIG. 15 can serve as one of the many implementation examples of the transmitting device 810 and the receiving device 820 shown in FIG. 8. In the embodiment shown in FIG. 15, the transmitting device 810 includes a coding layer circuit 811, a verification circuit 812, and a physical layer circuit 813. According to actual design, in some embodiments, the coding layer circuit 811 may include a physical coding sublayer (PCS) circuit and/or other coding layer circuits. The coding layer circuit 811 is configured to generate a data unit stream (a plurality of data units, including the current data unit tx_D[m:0] shown in FIG. 15).

The physical layer circuit 813 is coupled to the coding layer circuit 811 to receive these data units. The physical layer circuit 813 can transmit the data unit stream including these data units to the receiving device 820 through the data channel CH_d of the communication interface IF8. For instance, the physical layer circuit 813 can transmit the current data unit D[m:0] to the receiving device 820 through the data channel CH_d of the communication interface IF8.

The verification circuit 812 is coupled to the coding layer circuit 811 to receive these data units. The verification circuit 812 can use these data units to calculate the original verification information units corresponding to these data units. This embodiment does not limit the specific implementation of the verification circuit 812. For instance, the verification circuit 812 may include a cyclic redundancy check (CRC) circuit, a parity check circuit, or other verification data generation circuits, depending on the actual applications. The CRC circuit can perform any CRC code calculation (eg, 16-bit CRC code calculation) to generate a plurality of original verification information units corresponding to the data units.

The verification circuit 812 can output the original verification information units to the physical layer circuit 813. The physical layer circuit 813 can transmit the original verification information units to the receiving device 820 through the verification information channel CH_inf of the communication interface IF8. For instance, the verification circuit 812 can use the current data unit tx_D[m:0] to calculate the current original verification information unit C[n:0] corresponding to the current data unit tx_D[m:0] can output the current original verification information unit C[n:0] to the physical layer circuit 813. The physical layer circuit 813 can transmit the current original verification information unit C[n:0] to the receiving device 820 through the verification information channel CH_inf. According to actual design, in some embodiments, the physical layer circuit 813 may include a physical medium attachment (PMA) circuit and/or other physical layer circuits.

In the embodiment shown in FIG. 15, the receiving device 820 includes a physical layer circuit 821, a check circuit 822, and a coding layer circuit 823. Depending on the actual design, in some embodiments, the physical layer circuit 821 may include a physical medium attachment (PMA) circuit and/or other physical layer circuits, and the coding layer circuit 823 may include a physical coding sublayer (PCS) circuit and/or other coding layer circuits. The physical layer circuit 821 can receive the data unit stream including multiple data units from the data channel CH_d of the communication interface IF8 and can receive the original verification information units corresponding to the multiple data units from the verification information channel CH_inf of the communication interface IF8. For instance, the physical layer circuit 821 can receive the current data unit D[m:0] from the data channel CH_d of the communication interface IF8 and can receive the current original verification information unit C[n:0] from the verification information channel CH_inf. The coding layer circuit 823 is coupled to the physical layer circuit 821. Based on the notification from the check circuit 822, the coding layer circuit 823 may decide to receive (process) or ignore the current data unit rx_D[m:0] from the physical layer circuit 821.

The check circuit 822 is coupled to the physical layer circuit 821 to receive the current original verification information unit C[n:0] corresponding to current data unit rx_D[m:0]. The check circuit 822 can use the current original verification information unit C[n:0] received from the verification information channel CH_inf to verify whether the current data unit rx_D[m:0] received from data channel CH_d has errors. When the current data unit rx_D[m:0] is correct, the check circuit 822 can notify the coding layer circuit 823 to receive and process the current data unit rx_D[m:0]. When the current data unit rx_D[m:0] is erroneous, the check circuit 822 can notify the coding layer circuit 823 to ignore the current data unit rx_D[m:0].

Further, when the check circuit 822 assigns the current data unit rx_D[m:0] as erroneous, the check circuit 822 further generates an error flag ERR to the physical layer circuit 821. The physical layer circuit 821 transmits the error flag ERR back to the transmitting device 810, such that transmitting device 810 retransmits the current data unit D[m:0] to the receiving device 820 through the data channel CH_d based on the error flag ERR. To be specific, the coding layer circuit 811 of the transmitting device 810 can receive the error flag ERR from the communication interface IF8 through the physical layer circuit 813. Based on the error flag ERR, the coding layer circuit 811 can retransmit the current data unit tx_D[m:0] to the physical layer circuit 813, such that the physical layer circuit 813 retransmits the current data unit D[m:0] to the receiving device 820 through the data channel CH_d.

This embodiment does not limit the specific implementation of the check circuit 822. For instance, in the embodiment shown in FIG. 15, the check circuit 822 may include a verification circuit 822a and a comparison circuit 822b. The verification circuit 822a is coupled to the physical layer circuit 821 to receive the current data unit rx_D[m:0]. The verification circuit 822a can use the current data unit rx_D[m:0] received from the data channel CH_d to calculate a current calculated verification information unit RXC[n:0] corresponding to the current data unit rx_D[m:0]. The comparison circuit 822b is coupled to the physical layer circuit 821 to receive the current original verification information unit C[n:0] corresponding to the current data unit rx_D[m:0]. The comparison circuit 822b is coupled to the verification circuit 822a to receive the current calculated verification information unit RXC[n:0]. The comparison circuit 822b can compare the current calculated verification information unit RXC[n:0] with the current original verification information unit C[n:0] received from the verification information channel CH_inf to determine whether the current data unit rx_D[m:0] received from the data channel CH_d has errors. When the current data unit rx_D[m:0] is correct, the comparison circuit 822b can notify the coding layer circuit 823 to receive and process the current data unit rx_D[m:0].

When the current data unit rx_D[m:0] is erroneous, the comparison circuit 822b can notify the coding layer circuit 823 to ignore (not to process) the current data unit rx_D[m:0]. When the comparison circuit 822b determines that the current calculated verification information unit RXC[n:0] does not match the current original verification information unit C[n:0], the comparison circuit 822b generates an error flag ERR to the physical layer circuit 821. The physical layer circuit 821 can transmit the error flag ERR back to the transmitting device 810, such that transmitting device 810 retransmits the current data unit D[m:0] to the receiving device 820 through the data channel CH_d based on the error flag ERR.

In view of the foregoing, in the foregoing embodiments, the transmitting device 810 can synchronously transmit the current data unit D[m:0] and the current original verification information unit C[n:0] to the receiving device 820 through different channels of the communication interface IF8. Therefore, the transmission of the current original verification information unit C[n:0] does not consume the bandwidth of the data channel CH_d of the communication interface IF8. After receiving the current data unit rx_D[m:0] and before receiving the next data unit, the receiving device 820 can verify whether the current data unit rx_D[m:0] received from the data channel CH_d has errors in real time based on the current original verification information unit C[n:0] corresponding to the current data unit rx_D[m:0]. Therefore, the transmission latency t10 of the communication system 800 can be minimized.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A communication system, comprising:
a transmitting device, configured to transmit a data unit stream to a data channel of a communication interface, wherein the data unit stream comprises a plurality of data units, the transmitting device calculates an original verification information unit of each of the data units, and the transmitting device transmits the original verification information units corresponding to the data units to a verification information channel of the communication interface based on a transmission timing of the data units in the data channel, wherein the data channel and the verification information channel are different channels of the communication interface; and
a receiving device, configured to receive the data units of the data unit stream from the data channel of the communication interface and receive the original verification information units corresponding to the data units from the verification information channel of the communication interface, wherein
after receiving a current data unit among the data units and before receiving a next data unit among the data units, the receiving device verifies whether the current data unit received from the data channel has errors in real time based on a current original verification information unit corresponding to the current data unit in the original verification information units,
wherein the transmitting device comprises:
a coding layer circuit configured to generate the data units;

a physical layer circuit coupled to the coding layer circuit to receive the data units and configured to transmit the data unit stream comprising the data units to the receiving device through the data channel of the communication interface; and a verification circuit coupled to the coding layer circuit to receive the data units, wherein the verification circuit uses the data units to calculate the original verification information units corresponding to the data units, the verification circuit outputs the original verification information units to the physical layer circuit, and the physical layer circuit transmits the original verification information units to the receiving device through the verification information channel of the communication interface.

2. The communication system according to claim 1, wherein when the transmitting device transmits the current data unit to the data channel, the transmitting device synchronously transmits the current original verification information unit corresponding to the current data unit to the verification information channel.

3. The communication system according to claim 1, wherein when the receiving device receives the current data unit from the data channel, the receiving device synchronously receives the current original verification information unit corresponding to the current data unit from the verification information channel.

4. The communication system according to claim 1, wherein the receiving device uses the current data unit received from the data channel to calculate a current calculated verification information unit corresponding to the current data unit, and the receiving device compares the current calculated verification information unit with the current original verification information unit received from the verification information channel to determine whether the current data unit received from the data channel has errors.

5. The communication system according to claim 1, wherein when the current data unit received from the data channel of the communication interface is erroneous, the receiving device returns an error flag to the transmitting device, and the transmitting device retransmits the current data unit to the receiving device through the data channel based on the error flag.

6. The communication system according to claim 1, wherein the verification circuit comprises a cyclic redundancy check circuit or a parity check circuit.

7. The communication system according to claim 6, wherein the cyclic redundancy check circuit performs 16-bit cyclic redundancy check code calculation to generate the original verification information units.

8. The communication system according to claim 1, wherein the receiving device comprises:

a physical layer circuit configured to receive the data unit stream comprising the data units from the data channel of the communication interface and receive the original verification information units corresponding to the data units from the verification information channel of the communication interface;

a coding layer circuit coupled to the physical layer circuit; and a check circuit coupled to the physical layer circuit to receive the data units and the original verification information units corresponding to the data units, wherein the check circuit uses the current original verification information unit received from the verification information channel to verify whether the current data unit received from the data channel has errors, the check circuit notifies the coding layer circuit to receive and process the current data unit when the current data unit is correct, and the check circuit notifies the coding layer circuit to ignore the current data unit when the current data unit is erroneous.

9. The communication system according to claim 8, wherein when the current data unit is erroneous, the check circuit further generates an error flag to the physical layer circuit, and the physical layer circuit transmits the error flag back to the transmitting device, such that the transmitting device retransmits the current data unit to the receiving device through the data channel based on the error flag.

10. The communication system according to claim 8, wherein the check circuit comprises:

a verification circuit coupled to the physical layer circuit to receive the data units, wherein the verification circuit uses the current data unit received from the data channel to calculate a current calculated verification information unit corresponding to the current data unit; and a comparison circuit, coupled to the physical layer circuit to receive the original verification information units corresponding to the data units, and coupled to the verification circuit to receive the current calculated verification information unit, wherein the comparison circuit compares the current calculated verification information unit with the current original verification information unit received from the verification information channel to determine whether the current data unit received from the data channel has errors, the comparison circuit notifies the coding layer circuit to receive and process the current data unit when the current data unit is correct, and the comparison circuit notifies the coding layer circuit to ignore the current data unit when the current data unit is erroneous.

11. The communication system according to claim 10, wherein when the current calculated verification information unit does not match the current original verification information unit, the comparison circuit generates an error flag to the physical layer circuit, and the physical layer circuit transmits the error flag back to the transmitting device, such that the transmitting device retransmits the current data unit to the receiving device through the data channel based on the error flag.

12. An operation method of a communication system, comprising:

calculating, by a transmitting device, an original verification information unit of each of a plurality of data units comprised in a data unit stream;

transmitting, by the transmitting device, the data unit stream to a data channel of a communication interface;

transmitting, by the transmitting device, the original verification information units corresponding to the data units to a verification information channel of the communication interface based on a transmission timing of the data units in the data channel, wherein the data channel and the verification information channel are different channels of the communication interface;

receiving, by a receiving device, the data units of the data unit stream from the data channel of the communication interface;

receiving, by the receiving device, the original verification information units corresponding to the data units from the verification information channel of the communication interface; and after receiving a current data unit among the data units and before receiving a next data unit among the data units, verifying, by the receiving device, whether the current data unit received from the data channel has errors in real time based on a current original verification information unit corresponding to the current data unit in the original verification information units, wherein the transmitting device comprises:

a coding layer circuit configured to generate the data units;

a physical layer circuit coupled to the coding layer circuit to receive the data units and configured to transmit the data unit stream comprising the data units to the receiving device through the data channel of the communication interface; and a verification circuit coupled to the coding layer circuit to receive the data units, wherein the verification circuit uses the data units to calculate the original verification information units corresponding to the data units, the verification circuit outputs the original verification information units to the physical layer circuit, and the physical layer circuit transmits the original verification information units to the receiving device through the verification information channel of the communication interface.

13. The operation method according to claim 12, further comprising:

synchronously transmitting, by the transmitting device, the current original verification information unit corresponding to the current data unit to the verification information channel when the transmitting device transmits the current data unit to the data channel.

14. The operation method according to claim 12, further comprising:

synchronously receiving, by the receiving device, the current original verification information unit corresponding to the current data unit from the verification information channel when the receiving device receives the current data unit from the data channel.

15. The operation method according to claim 12, further comprising:

using, by the receiving device, the current data unit received from the data channel to calculate a current calculated verification information unit corresponding to the current data unit; and comparing, by the receiving device, the current calculated verification information unit with the current original verification information unit received from the verification information channel to determine whether the current data unit received from the data channel has errors.

16. The operation method according to claim 12, further comprising:

returning, by the receiving device, an error flag to the transmitting device when the current data unit received from the data channel of the communication interface is erroneous; and retransmitting, by the transmitting device, the current data unit to the receiving device through the data channel based on the error flag.

* * * * *